(12) United States Patent
Ziegler et al.

(10) Patent No.: US 9,172,653 B2
(45) Date of Patent: Oct. 27, 2015

(54) SENDING REQUEST MESSAGES TO NODES INDICATED AS UNRESOLVED

(75) Inventors: Michael L Ziegler, Roseville, CA (US); Steven Glen Jorgensen, Newcastle, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 478 days.

(21) Appl. No.: 13/187,800

(22) Filed: Jul. 21, 2011

(65) Prior Publication Data
US 2013/0024541 A1    Jan. 24, 2013

(51) Int. Cl.
*H04L 12/801* (2013.01)
*H04L 12/863* (2013.01)
*H04L 12/825* (2013.01)

(52) U.S. Cl.
CPC .............. *H04L 47/39* (2013.01); *H04L 47/15* (2013.01); *H04L 47/26* (2013.01); *H04L 47/263* (2013.01); *H04L 47/266* (2013.01); *H04L 47/6205* (2013.01); *H04L 47/34* (2013.01)

(58) Field of Classification Search
CPC ........ H04L 12/1863–12/1872; H04L 12/1895; H04L 12/5695; H04L 47/10–47/115; H04L 47/15; H04L 47/2416; H04L 47/26–47/266; H04L 47/621; H04L 47/722; H04L 47/741–47/748
USPC .......... 370/216–218, 229–231, 312; 709/217–219, 223–226, 230–232, 235
See application file for complete search history.

(56) References Cited

U.S. PATENT DOCUMENTS

| | | | |
|---|---|---|---|
| 8,416,687 B1 * | 4/2013 | Hutchison | 370/230 |
| 2002/0129029 A1 * | 9/2002 | Warner et al. | 707/100 |
| 2003/0169687 A1 * | 9/2003 | Bardini et al. | 370/229 |
| 2005/0237932 A1 * | 10/2005 | Liu | 370/230 |
| 2006/0104275 A1 * | 5/2006 | Dohm | 370/390 |
| 2008/0043619 A1 | 2/2008 | Sammour et al. | |
| 2008/0195912 A1 | 8/2008 | Mende et al. | |
| 2009/0201818 A1 | 8/2009 | Patwardhan et al. | |

FOREIGN PATENT DOCUMENTS

EP    0993139    4/2000

OTHER PUBLICATIONS

< http://www.ijest.info/docs/IJEST10-02-10-140.pdf > V.Mallaiah et al., "Multicast Zone Routing Protocol in Wireless Mobile Adhoc Networks" on pp. 5647-5656; vol. 2; Issue 10.2010.

* cited by examiner

*Primary Examiner* — Michael Thier
*Assistant Examiner* — Eric Myers
(74) *Attorney, Agent, or Firm* — Hewlett-Packard Patent Department

(57) ABSTRACT

Techniques are provided for sending request messages to destination nodes. Destination nodes may be indicated as unresolved. Request messages are sent to destination nodes indicated as unresolved.

15 Claims, 9 Drawing Sheets

SENDING REQUEST MESSAGES TO NODES INDICATED AS UNRESOLVED

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may then forward the data packet to another port for output to either the desired destination or to another network device for further forwarding toward the destination. The bandwidth available in a network device for such data transfer may be finite, and as such it would be desirable to make such transfers as efficient as possible.

DETAILED DESCRIPTION

Figure 1:
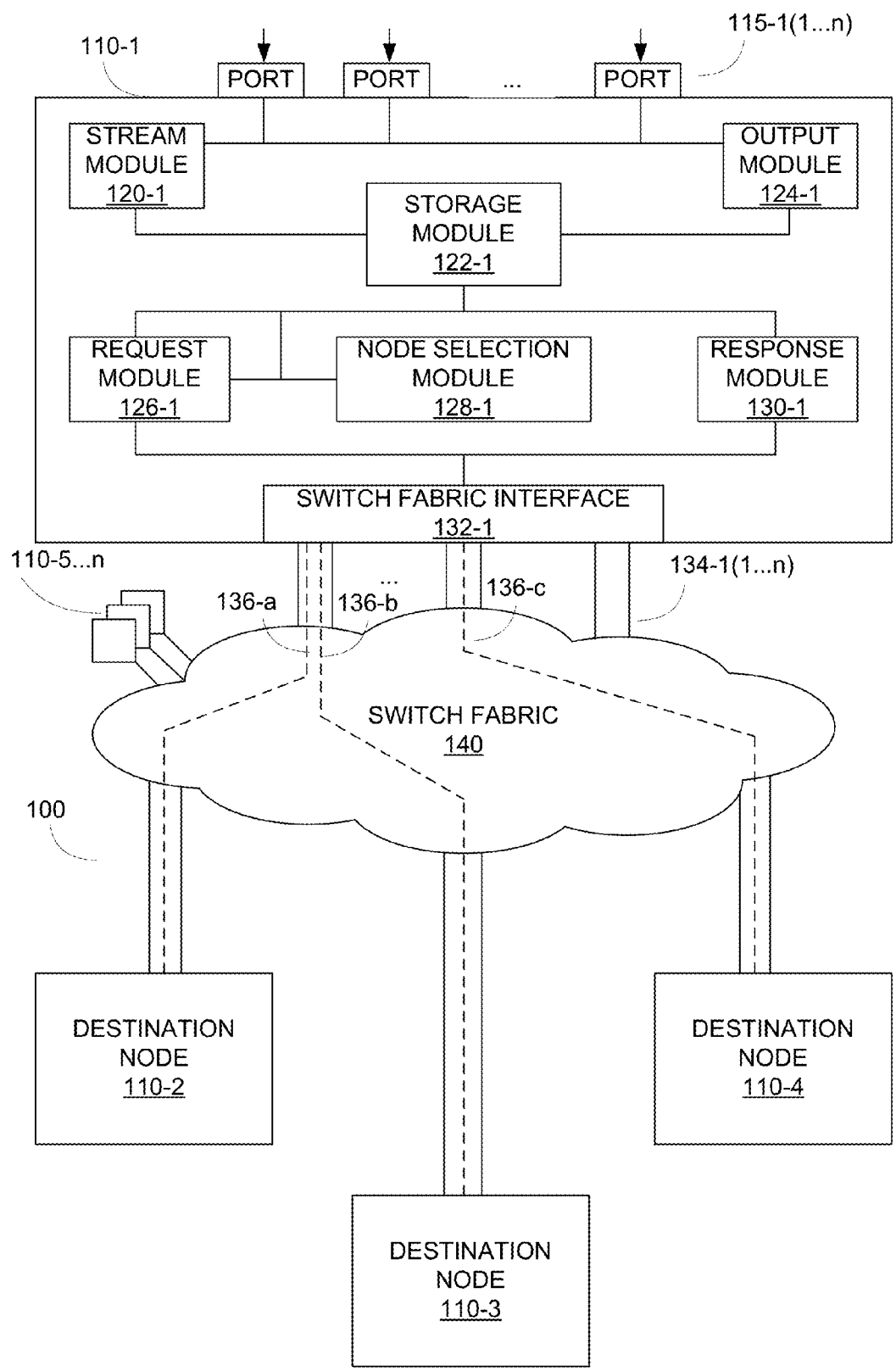
FIG. 1 is a high level block diagram of an example of a network device.

A network device may receive data packets from a plurality of sources and may route those data packets to the desired destination. In some cases the received data packets may be routed to multiple destinations. The network device may receive the data packets through ports that are connected to external packet sources. The network device may then route those data packets to other ports on the network device through a switch fabric. The switch fabric allows for packets to be sent from one port on the network device to different ports. The network device may then output the data packet on those different ports.

In many cases, it is desirable that an order between data packets be maintained. For example, a source may be sending a large file to a destination. The file may be broken up into many data packets. The destination may expect those packets to be received in order. Although higher layer protocols exist to address the situation of packets being received out of order, those protocols may require duplicate transmission of data packets once an out of order data packet is received. Such duplicate transmissions would lead to redundant data packet transfers within the switch fabric, which results in a reduction of the efficiency of the network device.

Although it is desirable for data packets to be output in the same order as received, solutions to achieve this result should not lead to additional inefficiency. A switch fabric may be segmented into multiple communications channels, each with a finite bandwidth. A characteristic of a communications channel may be that messages that are input to the channel are output in the same order as they were input. Although restricting transfer of data packets to a single channel would result in the packets being sent in the correct order, such a solution may not utilize the switch fabric bandwidth efficiently. While data packets are being sent over the finite bandwidth of a specific channel, other channels may have available bandwidth. Thus, the available bandwidth may be wasted if the data packets are restricted to a single channel.

One way to overcome the problem of restricting data packet transfer to a single channel is to use ordered request messages. Each data packet is associated with a request message and the request messages may be sent in the desired order over a designated communications channel. Because of the characteristics of a communications channel, the request messages may be received in order. Thus, the destination node is made aware of the desired order of the data packets. The data packets themselves may then be sent to the destination node in any order over any communications channel. Because the destination node is aware of the desired ordering from the request messages, the destination node is able to output the data packets in the desired order.

The solution described above ensures data packets are output in the correct order, so long as the request messages are received and processed in order. However, a problem may arise if the destination node is unable to process a request message. For example, a destination node may be unable to process a request message because insufficient resources, such as memory, are available on the destination node. Because proper ordering of output of data packets relies on the ordered receipt and processing of request messages, failure to process a request message may result in data packets being output in an incorrect order.

The problem of a destination node being unable to process a request message is further exacerbated in cases where the data packet is sent to multiple destination nodes. Situations may arise where one destination node is able to process a request message for a data packet while a different destination node is not able to process the request message for the same packet. Because the ordered output of data packets relies on request messages being received in order, the source may become deadlocked. This is because the source cannot continue to send request messages, as the destination node that was unable to process the request message may not be able to process additional request messages, otherwise the ordering of the request messages would be incorrect. The source node cannot continue sending request messages until the destination node that was unable to process the request message is able to receive it.

Simply resending the request message would also be ineffective because although the destination node that was unable to process the request message would be given another opportunity to process the message, the destination node that was able to process the request message would then receive a duplicate request message for the same data packet. Thus, the ordering of the data packets would no longer be correct, as a there would be a duplicate data packet. The source may become deadlocked as no further request messages may be sent if one destination node is unable to process a request message, but that destination node may only be able to process the request message if a duplicate request message is sent.

Example embodiments described herein overcome this problem by providing techniques for stopping and restarting a stream of request messages that are sent over the designated communications channels. If a request message is unable to be processed by any destination node, that destination node may inform the source node to stop sending additional request messages to all destination nodes and may discard any further request messages. The source node, at a later point in time, may resume sending request messages, beginning with the request message that was the first request message that was unable to be processed by any destination node. The source node may maintain a status as to which destination nodes have already received and processed the request messages and may only resend request messages to destination nodes that have not already processed the message. Thus, no duplicate request messages may be sent and ordering of request messages is preserved.

FIG. 1 is a high level block diagram of an example of a network device. The network device 100, such as a switch or router, may implement the example techniques described herein in order to provide for the ability to stop and restart a sequence of ordered request messages that are being sent to multiple destination nodes. The network device may include a plurality of nodes 110-1 . . . n. For purposes of clarity, only one node 110-1 is shown in detail in FIG. 1, however it should be understood that there may be any number of nodes, all of which have a generally identical structure. Furthermore, all nodes are capable of both sending and receiving packets, and may be doing so simultaneously. However, for ease of description, FIG. 1 will be described in terms of a source node 110-1 which may receive data packets from external sources and send request messages for the data packets to destination nodes 110-2,3,4. The destination nodes may receive the request messages and respond with an indication of the ability of the destination node to accept the request messages. It should be understood that in operation, a node may act as both a source node and a destination node at the same time for different data packets or even for the same packet.

Source node 110-1 may include a plurality of ports 115-1(1 . . . n). Ports 115-1 may be used to connect to external sources of data packets, such as computers, servers, or even other network devices. The source node 110-1 may receive data packets from these external sources through the ports. The number of ports that exist on a source node may be determined by the design of the network device. For example, in some modular switches, capacity may be added by inserting an additional line card containing 4, 8, 16, or 32 ports. The line card may also contain a node chip to control the data packets sent to and received from the ports. In some cases, depending on the number of ports included on a line card, more than one node chip may be required. However, for purposes of this explanation, a set of ports may be controlled by a single node chip.

The node chip, which may simply be referred to as a node, may typically be implemented in hardware. Due to the processing speed requirements needed in today's networking environment, the node may generally be implemented as an application specific integrated circuit (ASIC). The ASIC may contain memory, general purpose processors, and dedicated control logic. The various modules that are described below may be implemented using any combination of the memory, processors, and logic as needed.

The source node 110-1 may include a stream module 120-1, a storage module 122-1, an output module 124-1, a request module 126-1, a node selection module 128-1, a response module 130-1 and a switch fabric interface 132-1. The stream module 120-1 may receive all the data packets received from the ports 115-1. The stream module may then classify the data packets into streams. A stream is an ordered set of data packets that may be output in the same order as exists within the stream. For the present example, the criterion used to classify data packets into streams is unimportant. What should be understood is that a stream may be a set of data packets in a specified order. These data packets should be output from ports of the network device 100 in the same order as they exist in the stream. There is no requirement as to how the data packets are transferred within the network device.

As the stream module 120-1 receives data packets from the ports 115-1, the data packets are added to the stream, and stored in storage module 122-1. Storage module 122-1 may be any form of suitable memory, such as static or dynamic random access memory (SRAM/DRAM), FLASH memory, or any other memory that is able to store data packets.

The request module 126-1 may be notified of data packets as they are added to the stream. The request module may interface with a node selection module 128-1 to determine to which nodes the data packet should be sent. As mentioned above, a data packet within a stream may be destined for multiple destination nodes. The node selection module may determine which nodes should receive the data packet. The request module may generate and send request messages to the determined destination nodes to inform the destination nodes that a data packet is available for delivery. The request module may issue those request messages to the selected destination nodes in the same order as the data packets were added to the stream. Thus, at each destination node, the request messages reflect the order in which the data packets selected for that destination node were added to the stream. The request module may send the request messages to the determined destination nodes through a switch fabric interface 132-1.

The switch fabric interface 132-1 is the interface through which a node communicates with the switch fabric 140. The switch fabric interface may contain communications links 134-1 (1 . . . n). Although depicted as separate physical links, it should be understood that there may also only be one physical link to the switch fabric, with multiple logical communications links defined within the single physical interface. The destination nodes 110-2,3,4 also contain a switch fabric interface and associated communications links The combination of a communications link on the source node, a path through the switch fabric 140, and a communications link on a destination node may form a communications channel. A characteristic of a communications channel is that messages sent over the channel may be received in the order sent. No such guarantee exists for messages sent using different communications channels, and those messages may be received in any order. A specific communications channel is designated for each stream on the source node 110-1 for each destination node. For example, a designated communications channel 136-a may be used for all request messages for the stream that is being described in this example when the request messages are being sent to destination node 110-2. Similarly, communications channels 136-b,c may be the designated communications channels for request messages that are being sent to destination nodes 110-3,4 respectively. The request module may use the designated communications channel for a given destination node to send all request messages for the stream for that destination node. Because all request messages sent for the stream to a given destination node may use the designated communications channel for that destination node and stream, it is guaranteed that those request messages may be received in the same order by the destination nodes 110-2,3,4. It should be noted that although there is a designated communications channel for each stream to each destination node, this does not mean that every stream on the source node may use the same communications channel for a given destination node. For example, if there are two streams on a source node, there may be two different designated communications channels to a single destination node. What should be understood is that through the use of a designated communications channel per stream per destination node, it can be assured that request messages may arrive at a given destination node in order.

The switch fabric 140 is used to connect the nodes 110-1 . . . n. The switch fabric may receive messages from a source node 110-1 through the switch fabric interface 132-1 and may route those messages to destination nodes 110-2,3,4. The destination nodes may receive the messages through their own switch fabric interfaces. The same applies for communication in the reverse direction. The switch fabric may be segmented into multiple communications paths. Each communications path may have a finite bandwidth. Messages sent over a specific communications path may be delivered in the same order that they were sent. As mentioned above, a combination of communications links at the source and destination nodes along with a path through the switch fabric may form a communications channel. Messages sent through the communications channel may be received in the order that they were sent.

The destination nodes 110-2,3,4 have a similar structure to the source node 110-1, however the various modules may provide different processing when acting as a destination node. For purposes of clarity, the modules in the destination nodes are not shown. However, the same modules shown on node 110-1 are also present on destination nodes 110-2,3,4. The request messages may be received, in order, by the request modules on the destination nodes. The request modules may determine if the data packet associated with the request message can be processed by that destination node. For example, if storage space in the storage module for the data packet associated with the request message cannot be allocated on a given destination node, the request message cannot be processed on that node. As another example, a destination node may be overloaded and is currently unable to process the request message. The request modules may determine if the request message is accepted. It should be understood that the decision to accept a request message may be made on a per destination node basis. Thus, a request message associated with a data packet may be accepted by one destination node while at the same time being refused by a different destination node.

As the request messages are all sent over the designated communications channel 136-a,b,c, the request messages may be received at each destination node in the same order as packets were added to the stream. Thus, the destination nodes are made aware of the ordering of the data packets in the stream based on the order of the request messages. However, if a request message is not able to be processed by a given destination node, it would not make sense to accept any later received request messages at that node, as those request messages would then be out of order. This is because the data packet associated with the request message that was not accepted would be missing from that destination node. As such, when a request module determines that a request message cannot be accepted, the destination node that is unable to accept the request message may inform the source node to stop sending additional request messages.

The destination nodes 110-2,3,4 may use the response modules to send a response message to the source node. The response message may be sent over any communications channel. There is no requirement to use a designated communications channel 136-a,b,c. The response messages therefore may be received in any order by the source node 110-1. The response message may indicate if the request message is being accepted by the destination node that is sending the response message.

The response module 130-1 on the source node may receive the response messages. Each response message may indicate if the destination node is accepting the request message. If the destination node is not accepting the request message, the response module may cause the source node to stop issuing new request messages for the stream to all destination nodes, even if some of the nodes are still able to process additional request messages. As explained above, if a request message is not accepted by a given destination node, additional request messages for the stream should not be sent to that given destination node, as those request messages cannot be accepted. In addition, the response module 130-1 may determine when responses to all request messages have been received from all destination nodes. In cases where issuing new request messages has been stopped, it is necessary to restart issuing request messages at some point. The response module 130-1 may determine when request message should be issued again based on receipt of responses to all outstanding request messages. The process of stopping and restarting request messages will be described in further detail with respect to FIGS. 5(a-c).

The source node 110-1 and the destination nodes 110-2,3,4 may exchange the data packet associated with a request message over any communications channel of the switch fabric and in any order. For example, the source node may send the data packets to the destination node autonomously. In other implementations, the destination node may initiate transfer of each data packet from the source node. Any mode of transferring the data packets associated with request messages is suitable and the example implementations described herein do not rely on any specific method of transferring data packets. This beneficial result may be achieved through the ordered request messages, the ability to stop and restart ordered request messages, and the output module 124-1, which is shown as part of the source node. An output module also is present on each of destination nodes 110-2,3,4.

As mentioned above, request messages are sent over designated communications channels 136-a,b,c, thus guaranteeing that the request messages may be received by the destination nodes in order. If a particular request message cannot be accepted by a destination node and is refused, no additional request messages may be accepted by the destination node until the refused request message is accepted. Thus, the order of the accepted request messages may reflect the order of the data packets in the stream. In other words, the order of the data packets is conveyed to the destination nodes through the request messages alone.

All other messages and data packet transfers may be sent over any communications channel. Thus, there is neither a guarantee nor a requirement that messages, other than request messages, be received in order. For example, a data packet that is later in the stream of data packets may be received by a destination node prior to one that is earlier in the stream. As another example, a response message for a data packet that is later in the stream may be received before a response message for a data packet that is earlier in the stream, even though the request messages were sent to the same destination node. As yet another example, a request message for a data packet may be sent to two different destination nodes, however there is no guarantee as to the ordering of the responses from those destination nodes. The output modules may maintain the expected order of data packets based on the request messages. The output modules may output the data packets to a port (not shown) of the destination nodes 110-2,3,4 in the same order as the stream, based on the order of the request messages.

Data packets within a stream may thus be output from a port of a destination node in the same order as the stream, while only requiring that request messages be sent in order. Because ordering of the data packets is maintained through the request messages only, there is no requirement that the data packets be sent in any order or over a specific communications channel. As a communications channel typically has a finite bandwidth, the ability to use any available communications channel to send data packets increases efficiency, as there is no need to wait for a specific communications channel to become available. Furthermore, because any communications channel may be used to send data packets, efficiency through the switch fabric may be increased because multiple data packets may be transmitted through the switch fabric simultaneously over different communications channels.

The destination nodes have the ability to cause the source node to stop sending request messages if insufficient resources are available at the destination node to process the request messages. The request messages may be restarted at a later point in time, once sufficient resources are available at the destination nodes. The ability to stop and restart a stream of request messages beneficially allows the destination nodes to exert a form of flow control on the source node. Furthermore, stopping and restarting the stream of request messages may be done such that the destination nodes are made aware of the ordering of the data packets through the use of the request messages only.

Figure 2:
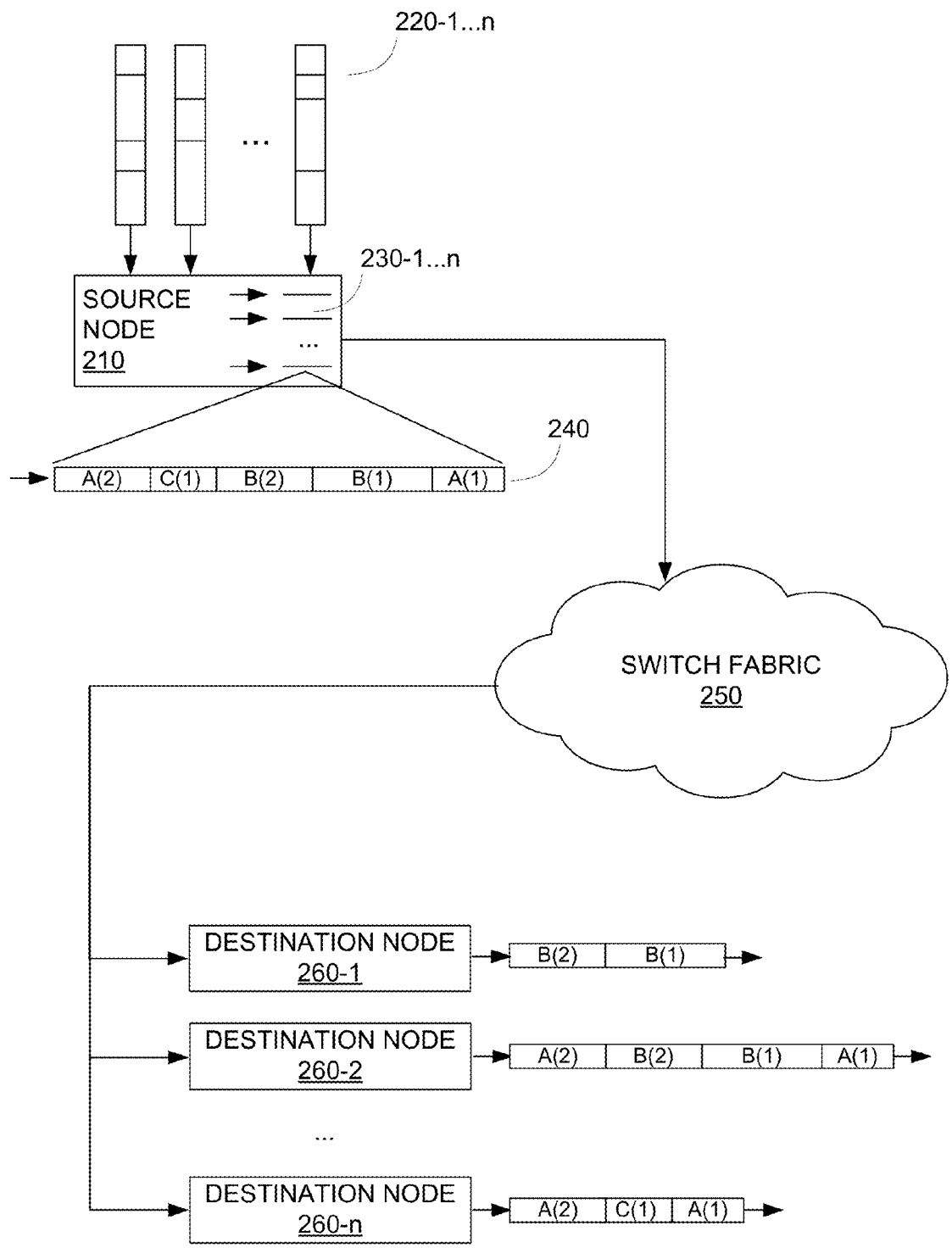
FIG. 2 depicts an example of a stream of ordered data packets.

FIG. 2 depicts an example of a stream of ordered data packets. A plurality of data packets may be received by a source node 210. For example, the packets may be received on the ports 220-1 . . . n of the source node. The received packets may come from end user computers, servers, or from other networking devices. These packets may all be received by the source node.

The source node 210 may classify these incoming packets into various streams 230-1 . . . n. The number of possible streams may be preset or may be configurable by a user. The source node, using a stream module (not shown) may classify the incoming packets into streams. Packets may be classified into streams based on many criteria. For example, all packets destined for a specific destination node may be classified into a stream. Packets with certain guaranteed quality of service (QoS) parameters may be classified into a stream. Packets originating from the same source may be classified into a stream. Combinations of criteria may be used as well, such as packets of a particular QoS, originating from the same source, and all destined for the same destination node may be classified into a stream. Example implementations discussed herein are not dependent on the exact criteria used to classify packets into streams.

However, once classified into a stream, the stream has certain characteristics. One characteristic of the stream is that it is an ordered list of data packets. As new packets are added to the stream, they are added to the end of the stream. Another characteristic of the stream is that data packets in the stream should be output from a port on a destination node in the same order as they appear in the stream. Note, this does not imply that the data packets are sent to the destination node in order or that every packet within a stream may be sent to the destination node for output on a port. Rather, the characteristic of a stream is that all packets destined for output on a port of a destination node may be output from that port in the same order as the packets in the stream.

The stream 240 is an expanded example of one of the streams 230-1 . . . n. As shown, there are currently five packets within the stream. The letter indications of the packets may indicate a certain criteria. For example, the letter criteria may indicate the source of the data packet. For purposes of this description, the letters are simply used to differentiate packets in terms of whether a destination node may receive a packet for output on a port. For example, if a destination node is to output one packet marked 'A' on a port, it may receive all packets marked A. Similarly, packets are marked with a number within their letter designation to represent the order of the data packets. For example, packet A1 is before packet A2.

The packets within a stream may be sent over a switch fabric 250 to a destination node. There is no requirement as to the order the packets are sent over the switch fabric, however, when the packets are output from a port of the destination node, the packets should be in the same relative order as they were in the stream.

Destination node 260-1 is an example of a destination node. In this example, destination node 260-1 is designated to receive data packets designated as 'B' and output those packets on a given port. Thus, the packets marked 'A' and 'C' will not be sent to destination 260-1. However, the packets that are sent to destination node 260-1 may be output from the given port in the same order as they exist in the stream 240. As shown, the packets are output by the given port of destination node 260-1 include those packets marked 'B' in the same order as they appeared in the stream 240. In particular packet B(1) is output before B(2) because that is the order of the packets in the stream 240. It should be understood that the destination nodes 260-1 . . . n may include other ports (not shown) and that the ordered output of data packets is on a per port basis. Furthermore, it should be understood that data packets from other streams may also be output on the port. In other words, packet B(1) may be output on the port before packet B(2), however packets from other streams may be output between packets B(1) and B(2).

Destination node 260-2 is an example of a destination node that is designated to receive packets designated as 'A' or 'B' and as such, no packets marked 'C' may be sent to destination node 260-2. Again, the packets are output from a port on the destination node 260-2 in the same order as they appeared in the stream 240. In this case, the output order is A(1), B(1), B(2), and A(2), because this is the order of the packets in the stream 240. Destination node 260-*n* is yet another example of a destination node that is designated to receive a different set of data packets. In this case, destination node 260-*n* is designated to receive data packets from the stream marked 'A' or 'C' and not those marked 'B'. Again, the data packets may be output on a port in the same order as they exist in the stream 240.

As mentioned previously, there is no ordering requirement as to how the data packets are sent over the switch fabric. Data packets may be sent or received in any order. For example, data packet B(2) may be the first data packet that is sent over the switch fabric and received by a destination node. However, data packet B(2) may not be output from the port on the destination node until all prior packets in the stream destined for the port have been output. Thus, data packet B(2) may not be output on a port before data packet B(1) is output. Maintaining the proper ordering of the output of the data packets relies on the ordering of the request messages and associated data structures, which are described in further detail below.

Figure 3:
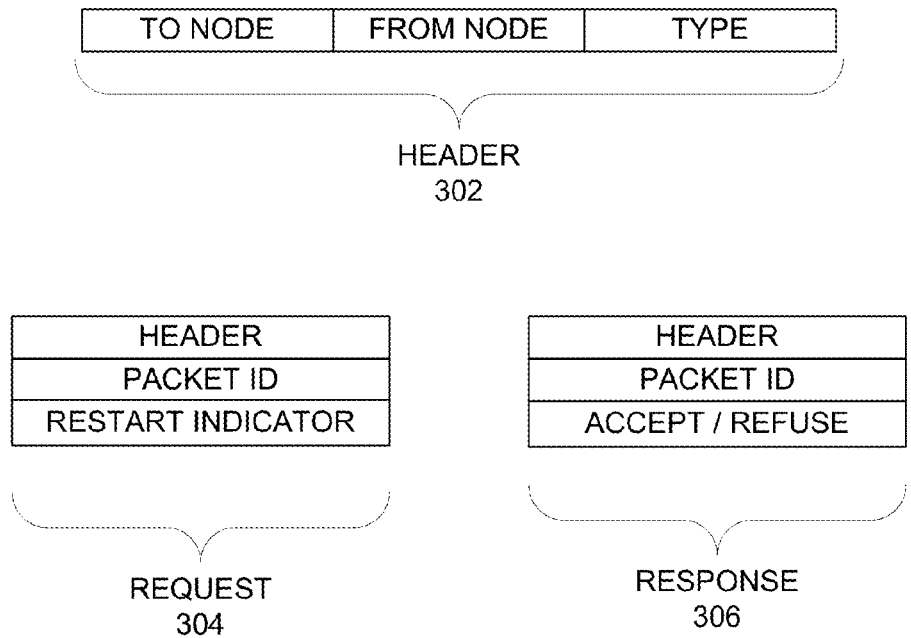
FIG. 3 depicts an example of message content and structure that may be used in an embodiment.

FIG. 3 depicts an example of message content and structure that may be used in an embodiment. The messages described in FIG. 3 are an example of those that may be used with the system as described in FIG. 1. In this example implementation, each message includes a header 302. The header may include a 'To Node' field which identifies the node that the message is intended for. Also included is a 'From Node' field which identifies the node that sent the message. The node identifications may used by the switching fabric to properly transfer messages from the sending node to the intended recipient node. In addition, the header may also include a 'Type' field which is further used to identify the contents and structure of the message when received.

In the present example implementation there are two basic message types that are used to convey the order of data packets in a stream from the source node to the destination nodes. The messages may also be used to control starting and stopping of request messages for the stream. Each message type includes the header 302 which will not be described further. The first message type is the request message 304. The request message may be used by a source node to notify a destination node that a data packet is available for delivery. The request message may include a 'Packet ID' field. The 'Packet ID' field may be used to identify a particular stream as well as an individual data packet within that stream. For example, a first portion of the 'Packet ID' may identify the individual stream within the source node that is the origin of the data packet, while a second portion may identify an individual data packet within that stream. In an alternate example implementation, the second portion of the 'Packet ID' may indicate the location in memory where information related to the packet is stored. Regardless of how implemented, the 'Packet ID' field may be used by the source and destination nodes to identify the data packet and the stream that is referred to in the request messages.

The request message 304 may also include a 'Restart Indicator' field. The 'Restart Indicator' field may be used by the source node to convey to the destination nodes that the source node is attempting to restart a stream that had previously been stopped. For example, if a stream has been stopped and the source node is now attempting to restart the stream, the source may set the 'Restart Indicator' field to true. The destination nodes may be able to differentiate between a request message that is attempting to restart a previously stopped stream and a request message for a stream that has not been stopped. Restarting a stream will be described in further detail with respect to FIGS. 5(a-c).

The second message type is the response message 306. The response message may be used by a destination node to notify the source node that a request message has been received. The response message may include a 'Packet ID' field that identifies the data packet as described with respect to the request message. When the source node receives the response message, the 'Packet ID' field may be used to match the response message with the originally sent request message. For example, the request message may be marked as having been acknowledged by a destination node once a response message containing a matching 'Packet ID' field has been received from that destination node.

The response message may also include an 'Accept/Refuse' field. The 'Accept/Refuse' field may be used by the destination node to inform the source node if the request message associated with a 'Packet ID' is being accepted or refused. For example, if the destination node receives a request message and is able to process the request message, the destination node may return a response message indicating that the request message was accepted. Likewise, if the destination node is unable to process the request message, a response message indicating a refusal may be sent to the source node. The response message indicating refusal may be sent if the destination node lacks sufficient resources to process the request message. A response message indicating refusal may be used to notify the source node that no additional request messages should be sent for that stream. The response message indicating refusal also informs the source node that the request message that was refused may need to be sent again at a later time. Stopping and restarting a stream of request messages will be described in further detail with respect to FIGS. 5(a-c).

Figure 4:
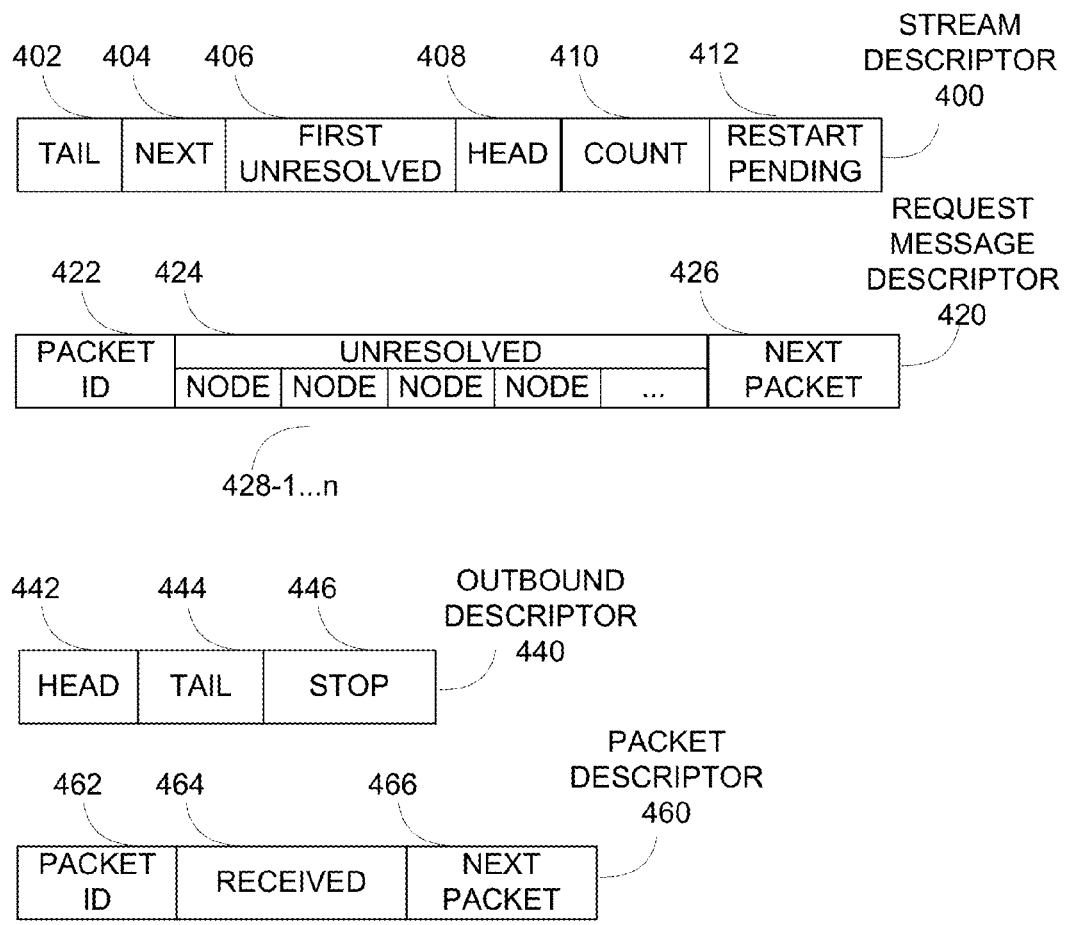
FIG. 4 depicts an example of data structures that may be used to maintain the status of data packets.

FIG. 4 depicts an example of data structures that may be used to maintain the status of request messages. A stream descriptor 400 in combination with request message descriptors 420 may be an example of a source node data structure that is used to indicate the status of each data packet in the stream of ordered data packets. The status may be maintained at least until the data packet is successfully sent to all selected destination nodes. A stream descriptor may exist for each stream of ordered data packets on a source node. The stream descriptor may generally be a handle for a list, such as a linked list, of request message descriptors. Each request message descriptor may be associated with a data packet in the stream.

The stream descriptor 400 may contain several data fields. The tail (T) field 402 may be a pointer that points to the last request message descriptor in the list of request message descriptors. Likewise, the head (H) field 408 may be a pointer that points to the first request message descriptor in the list of request message descriptors. The stream descriptor may also contain a next (N) field 404 which is a pointer to the request message descriptor that is the next request message to be sent to the destination nodes.

The stream descriptor 400 may also contain a first unresolved (FU) field 406 which may be a pointer to the first request message descriptor in the list of request message descriptors that has yet to be fully resolved. A request message descriptor that is not fully resolved may be a request message descriptor for which request messages have not yet been sent to all the selected destination nodes or for which at least one destination node that was selected to receive the associated data packet has not accepted the request message. The stream descriptor may also include a count (C) field 410 which may indicate the number of request messages that have been sent for which no response message has been received. The count field may be incremented as each request message is sent and decremented when a response message is received.

The stream descriptor 400 may also include a restart pending (RP) field 412. The restart pending indicator may be used to indicate a stream that has been stopped. In general, no new request messages are sent to any destination nodes for a stream that has the restart pending indicator set.

The request message descriptor 420 may also contain several data fields. The packet id field 422 may identify the data packet that is associated with the request message descriptor. As mentioned above, the packet id may not only identify the particular packet within a stream, but may also identify the stream itself. The packet id field may be used to match request and response messages, such that when a response message is received, it can be determined which request message the response message is intended to reference.

The request message descriptor 420 may also include an unresolved field 424. The unresolved field may be used to indicate if a request message for the data packet associated with the request message descriptor should be sent to a destination node. The unresolved field may also be used to determine if a response accepting the request message has been received. The unresolved field may include node indicators 428-1 . . . n. There may be one node indicator for each possible destination node in the system. The node indicator may be used to determine if a particular destination node is to receive a request message for the packet associated with the request message descriptor. The node indicator may also be used to determine when a destination node has accepted the request message associated with the request message descriptor.

In one example implementation, the node indicators 428-1 . . . n may be a bit field. Each bit may represent a particular destination node. A set bit may indicate that the destination node has been selected by the node selection module to receive a certain data packet. A clear bit may indicate one of two possible conditions. First, the destination node was not selected to receive the data packet associated with the request message descriptor, and as such no request message for the data packet may be sent to the destination node. The second condition is that the destination node was selected and a response indicating acceptance of the request message has already been received. In either case, there may be no need to send the request message to the given destination node if the node status bit 428 for that node is clear.

For example, consider a system with three possible destination nodes. The node selection module may determine that nodes one and two are to receive a data packet from a stream, while node three should not receive the data packet. The node selection module may set the unresolved field to a value of one-one-zero. A one may indicate that a destination node should receive a data packet and may also be referred to as the destination node being unresolved. A zero may indicate the destination node should not receive the data packet or has already received and accepted the request message. A zero may indicate that the destination node is resolved, meaning no request message need be sent. Request messages may be issued for those nodes for which the unresolved status is set to one. At some point, the destination nodes that receive the request messages may respond. If a destination node is able to accept the request message, the node indicator for that node may be cleared. For example, if the second node was able to accept the request message, the unresolved field may have a value of one-zero-zero, indicating that the source node is still waiting for a response from the first destination node. The use of the unresolved field will be described in further detail with respect to FIGS. 5(*a-c*).

The request message descriptor may also include a next packet 426 field. As mentioned above, each request message descriptor may be associated with a data packet in a stream and are in the same order as the data packets in the stream. The request message descriptors may form a list, such as a linked list, that is in the same order as the data packets in the stream. The next packet field may be used to indicate which request message descriptor is the next descriptor in the order. When a new data packet is added to the stream, a new request message descriptor may be allocated and appended to the end of the list of request message descriptors. The next packet field of the request message descriptor that was previously at the tail of the list may be set to point to the newly allocated request message descriptor. The tail pointer may then be set to point to the newly added request message descriptor.

An outbound descriptor 440 in combination with packet descriptors 460 may be an example of a destination node data structure that is used to indicate the status of each data packet for which a request message has been received. The status may be maintained at least until the data packet is received from the source node. An outbound descriptor may exist for each stream of ordered data packets and on each destination node that may receive request messages. In other words, there may be an outbound descriptor on each destination node that is selected to receive data packets from a stream. The outbound descriptor may generally be a handle for a list, such as a linked list, of packet descriptors. Each packet descriptor may be associated with a data packet in a stream.

The outbound descriptor 440 may include a head pointer 442 which points to the first packet descriptor in the list of packet descriptors. The outbound descriptor may also include a tail pointer 444. The tail pointer may point to the last packet descriptor in the list of packet descriptors. The outbound descriptor may also include a stop 446 indicator. The stop indicator may indicate if the stream associated with the outbound descriptor is currently stopped at the destination node associated with this outbound descriptor. It should be understood that the stop indicator is a per destination node indicator. In other words, a stream may be stopped at one destination node while at the same time is not stopped at a different destination node. No new request messages for a stopped stream may be accepted by destination nodes whose stop indicator is set, unless certain conditions apply. These conditions will be described in further detail with respect to FIGS. 5(*a-c*).

A packet descriptor 460 may include several fields. A packet descriptor may include a packet id 462 field which identifies a particular data packet as well as the stream from which the data packet originated. The packet id field may be used to match request and response messages as discussed above. The packet descriptor may also include a received 464 field. The received field may be used to determine if the data packet associated with the packet descriptor has been received by the destination node.

The packet descriptor may also include a next packet 466 field. As mentioned above, the packet descriptors may form a linked list that is in the order of the received request messages. The next packet field may be used to indicate the next packet in the list. When a new request message is received and accepted, a new packet descriptor may be allocated. The next packet field of the packet descriptor pointed to by the tail pointer of the outbound descriptor may be set to point to the newly allocated packet descriptor. The tail pointer may then be set to point to the newly allocated packet descriptor. Operation of the outbound descriptor and the packet descriptors will be explained in further detail with respect to FIGS. 5(*a-c*).

Thus, the outbound descriptor at each selected destination node maintains a list of ordered packet descriptors which are each associated with a data packet and the ordering is the same as the ordering of the data packets in the stream of data packets. Proper ordering of the data packets in a stream can be conveyed to the destination nodes through the request messages independently, without having to send the data packets themselves in order.

FIGS. 5(*a-c*) depict an example of stopping and restarting a stream with multiple destinations. FIGS. 5(*a-c*) depict an example of data packets 500 that make up a stream of data packets at a source node 510. Each of the data packets 500 is labeled with a number to indicate the order of the data packet within the stream and a letter to indentify data packets that should either be sent or not sent to a particular destination. Thus, data packet A1 is before B1, which is before B2, and so on. Furthermore, if a destination node is to receive at least one packet marked with a letter, that destination node may receive all data packets marked with that letter. The data packets may be transferred to destination nodes 515, 516, 517. The data packets may be output from a port of each of the destination nodes 515, 516, 517 in the same order as the data packets in the stream of data packets 500. The ordered output is beneficially achieved without requiring that the data packets be transmitted in any particular order or over any particular communications channel.

Stream descriptor 520 may be a descriptor that has been defined on the source node 510 for the stream of data packets 500. Each stream on the source node may be associated with a stream descriptor and stream descriptor 520 represents one such stream. Each data packet in the stream may have a request message descriptor associated with the data packet and associated with the stream descriptor. As shown, request message descriptors 522-536 may be arranged to form a linked list. The ordering of the linked list may reflect the ordering of the data packets in the stream 500.

The stream descriptor 520 and the request message descriptors 522-536 may contain the fields that were described in further detail with respect to FIG. 4. The stream descriptor may include a tail pointer (T), a next pointer (N), a first unresolved pointer (FU), and a head pointer (H). The stream descriptor may also include a count field which may represent the number of outstanding request messages, as well as a restart pending indicator which indicates if the stream of request messages is currently stopped. Each request message descriptor may include a packet id, which identifies a particular data packet that is associated with the request message descriptor. Also included may be an unresolved indicator which may be used to determine which destination nodes shall receive a request message and if a response from that destination node has been received. A next pointer (NP) may be included to establish the order of the request message descriptors. Each of these pointers and fields will be described in further detail below.

As data packets are added to a stream, a new request message descriptor for the data packet may be allocated and appended to the stream descriptor. For example, when packet A3 was added to the stream, a new request message descriptor 536 may have been allocated. The packet id A3 may be stored in the new request message descriptor. The next packet pointer of the request message descriptor that was previously pointed to by the tail pointer may be set to point to the newly allocated request message descriptor. The tail pointer may then be reset to point to the newly added request message descriptor. By following this process, new request message descriptors are added to the end of the list of request message descriptors in the same order as the data packets. As such, the list of request message descriptors reflects the ordering of the data packets in the stream.

When a new request message descriptor is added to the stream descriptor, the source node 510 may select the destination nodes that are to receive the data packet associated with the request message descriptor. The selection may be performed by the node selection module 128 which was described with respect to FIG. 1. In one example implementation, each possible destination node is represented by a bit, and the set of bits is aggregated into a bit field, which may also be referred to as a destination status mask (DSM), which is stored in the unresolved field of the request message descriptor. For purposes of this description, references to the DSM indicate the unresolved field of a request message descriptor, the DSM indicating the destination nodes that have the unresolved indicator set for each destination node. If a destination node is selected to receive the data packet associated with the request message descriptor, the corresponding bit in the destination status mask may be set, otherwise the bit may remain clear. If a bit is set, the request message descriptor is unresolved for the destination node associated with that bit. An unresolved destination node is described in further detail below.

In the example shown in FIGS. 5(a-c), destination node 515 is to receive data packets marked as 'B', destination node 516 is to receive data packets marked as 'A' or 'B', and destination node 517 is to receive data packets marked as 'A' or 'C'. A portion of a destination status mask representing these three destination nodes would be three bits wide. For purposes of ease of description, only a portion of the destination status mask is described, but it should be understood that every node in the system would be represented by a bit in the destination status mask. The node selection module may set the corresponding bit for a destination if that destination is to receive the associated data packet. For example, request message descriptor 522 is associated with data packet A1. Packets marked with the letter A are to be sent to destination nodes 516 and 517, but not destination node 515. Thus the destination status mask would be set by the node selection module to zero-one-one, where the first bit represents destination node 515, the second bit represents destination node 516, and the third bit represents destination node 517. As another example, request message descriptor 528 is associated with data packet C1, which is to be sent only to destination node 517. Thus the destination status mask would be zero-zero-one, indicating that only destination node 517 is to receive a request message for data packet C1. The destination status mask may then be stored in the unresolved field of the request message descriptor, which will be described in further detail below.

In operation, the source node may maintain a next (N) pointer which points to the next request message descriptor for which request messages should be sent. The source node may examine the DSM of the request message descriptor and send a request message to each destination node that is indicated as unresolved. The source node may then advance the next pointer to the request message descriptor pointed to by the next packet field of the request message descriptor. As shown, the next pointer may have initially pointed to request message descriptor 522. The unresolved field of request message descriptor 522 indicates that destination nodes 516 and 517 are unresolved, because the destination status mask is set to zero-one-one. Request messages 564, 569 may have been sent to destination nodes 516, 517 respectively for the data packet associated with request message descriptor 522. The next pointer may then have been advanced to the next request message descriptor 524 which is pointed to by the next packet field of request message descriptor 522 and the process repeated.

The process of sending a request message and advancing the next pointer may continue as long as all the destination nodes are able to accept the request messages. As shown, request messages 561, 562, 563 are sent to destination node 515 because the DSM of the associated request message descriptors indicate that destination node 515 is unresolved for those request message descriptors. Likewise, request messages 564, 565, 566, 567, 568 are sent to destination node 516 and request messages 569, 570, 571 are sent to destination node 517 because the DSM of the associated request message descriptors indicate that destination nodes 516, 517 are unresolved for those request message descriptors respectively. It should be understood that the source node may continue to send request messages as long as the stream is not stopped. Thus, the source node does not wait for a response message to be received from the destination nodes prior to sending the next request messages. As such, there may be multiple request messages outstanding at any given time.

Figure 5A:
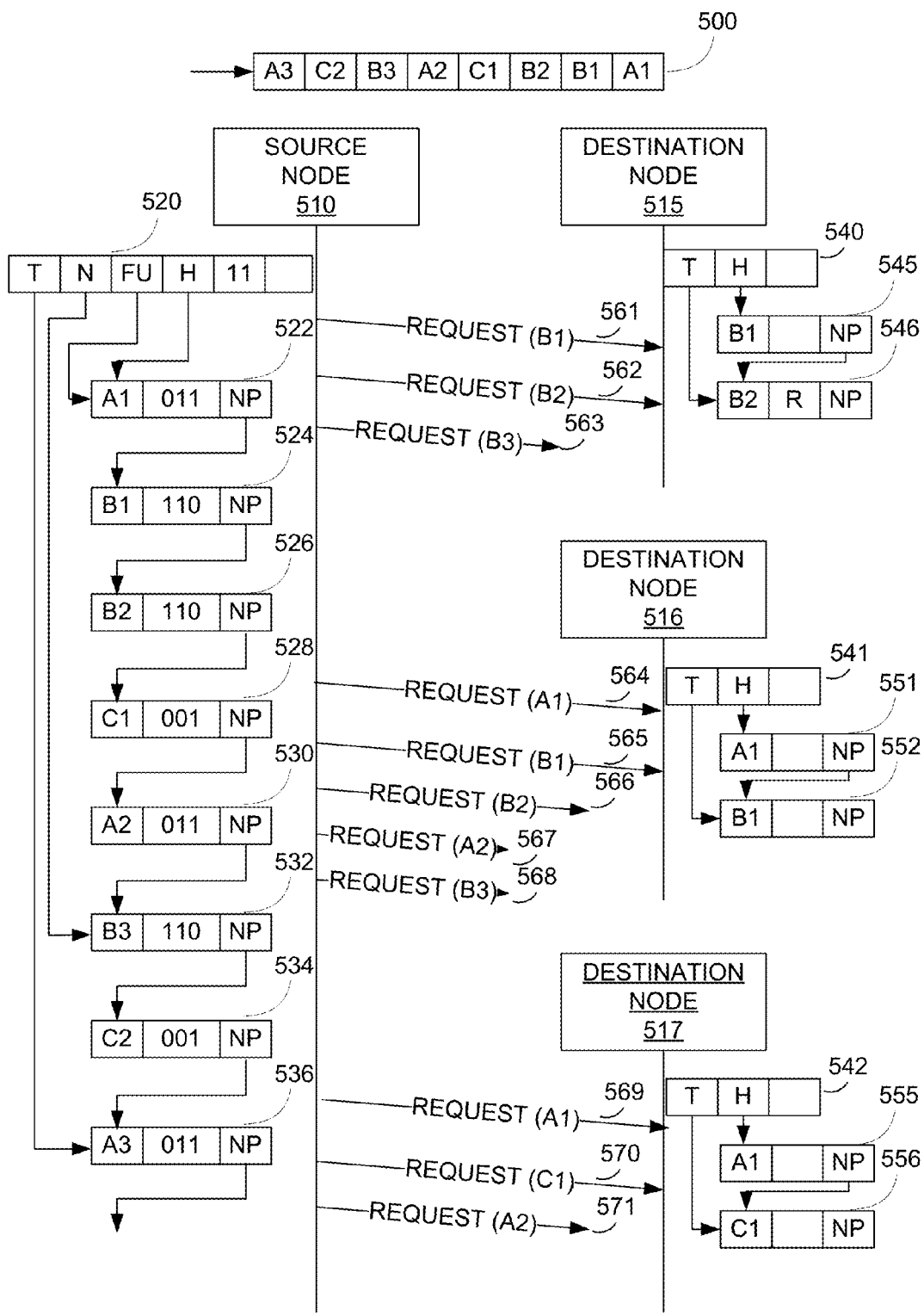
FIGS. 5(a-c) depict an example of stopping and restarting a stream with multiple destinations.

Each time a request message is sent, the count field may be incremented. Each time a response is received, the count field may be decremented. Thus, the count field indicates the number of request messages that have been sent that are currently awaiting a response. As shown in FIG. 5(a), the count field is set to eleven. The count is eleven because a total of eleven request messages 561-571 have been sent, but no response messages have been received. Thus, there are currently eleven request messages awaiting responses.

Destination nodes 515, 516, 517 may maintain outbound descriptors 540, 541, 542 respectively for each stream. Each outbound descriptor may contain a head pointer and a tail pointer. The head pointer may point to the first packet descriptor in a list of ordered packet descriptors, while the tail pointer points to the last packet descriptor in the list, for each destination node. Each outbound descriptor may also include a stop indicator, which indicates if the stream has been stopped for that destination node. As shown in FIG. 5(a) the stop indicator is currently cleared for each destination node, indicating that the stream associated with each outbound descriptor is currently not stopped for any destination node. The destination nodes may maintain an outbound descriptor for every stream in the system. In a different example implementation, each destination node may maintain a data structure (not shown) that is a bit field, with each bit associated with a stream. Setting the bit associated with a stream may indicate that the stream has been stopped. What should be understood is that each destination node maintains a stopped status for each stream of data packets that may be sent to the destination node.

The destination node 515 may receive the request message 461 that was sent from the source node 510. Upon receipt of the request message, the destination node may allocate a packet descriptor 545 and associate the packet descriptor with the data packet identified in the request message. The packet descriptor may be added to the list of packet descriptors. As shown, a request message 561 has been received for packet B1, and packet descriptor 545 has been allocated. A request message 562 has also been received for packet B2 and a packet descriptor 546 has been allocated. The packet descriptor 546 is added to the linked list of packet descriptors at the end of the list. Request message 563 may still be in flight through the switch fabric and has not yet been received by destination node 515. Thus, no packet descriptor for the data packet associated with request message descriptor 563 has been allocated.

Just as with destination node 515, destination node 516 may have received request messages 564, 565 for data packets A1, B1 respectively. Destination node 516 may allocate packet descriptors 551, 552 and associate those descriptors with the data packet identified in the respective request messages. Request messages 566, 567, 568 may not yet have been received by the destination node 516, and as such no packet descriptor is allocated. Destination node 517 may have received request messages 569, 570 for data packets A1, C1 respectively. Destination node 517 may allocate packet descriptors 555, 556 and associate those descriptors with the data packet identified in the respective request messages.

As described above, request messages for a single stream are sent over a communications channel that is designated for the stream and the destination node. The request messages may be received in the same order that they are sent. Because the request messages are sent by the source node in the same order as the stream of data packets, it is ensured that the packet descriptors in the destination nodes may be in the same order as the data packets in the stream of data packets. The destination nodes may use this ordering to ensure that data packets are output in the correct order, once received, without imposing any order on how the data packets are sent from the source node to the destination nodes.

For example, packet descriptor 546 has the received field set to R, which indicates that the data packet associated with this packet descriptor has already been received. However, the correct ordering of the data packets is determined by the list of packet descriptors. Because there is a packet descriptor 545 ahead of packet descriptor 546, the destination node 515 may not output packet B2 until the data packet B1 is received and output. The next data packet to be output may be maintained by the head pointer of the outbound descriptor. When the head pointer points to a packet descriptor whose associated data packet has been received, that data packet may then be eligible for output. The head pointer may then be advanced to the next packet descriptor. Thus, the data packets may be output in the same order as they exist in the stream of data packets. This output mechanism only needs request messages to be sent in order and beneficially places no restrictions on the order that data packets themselves are sent from the source to the destination nodes.

Figure 5B:
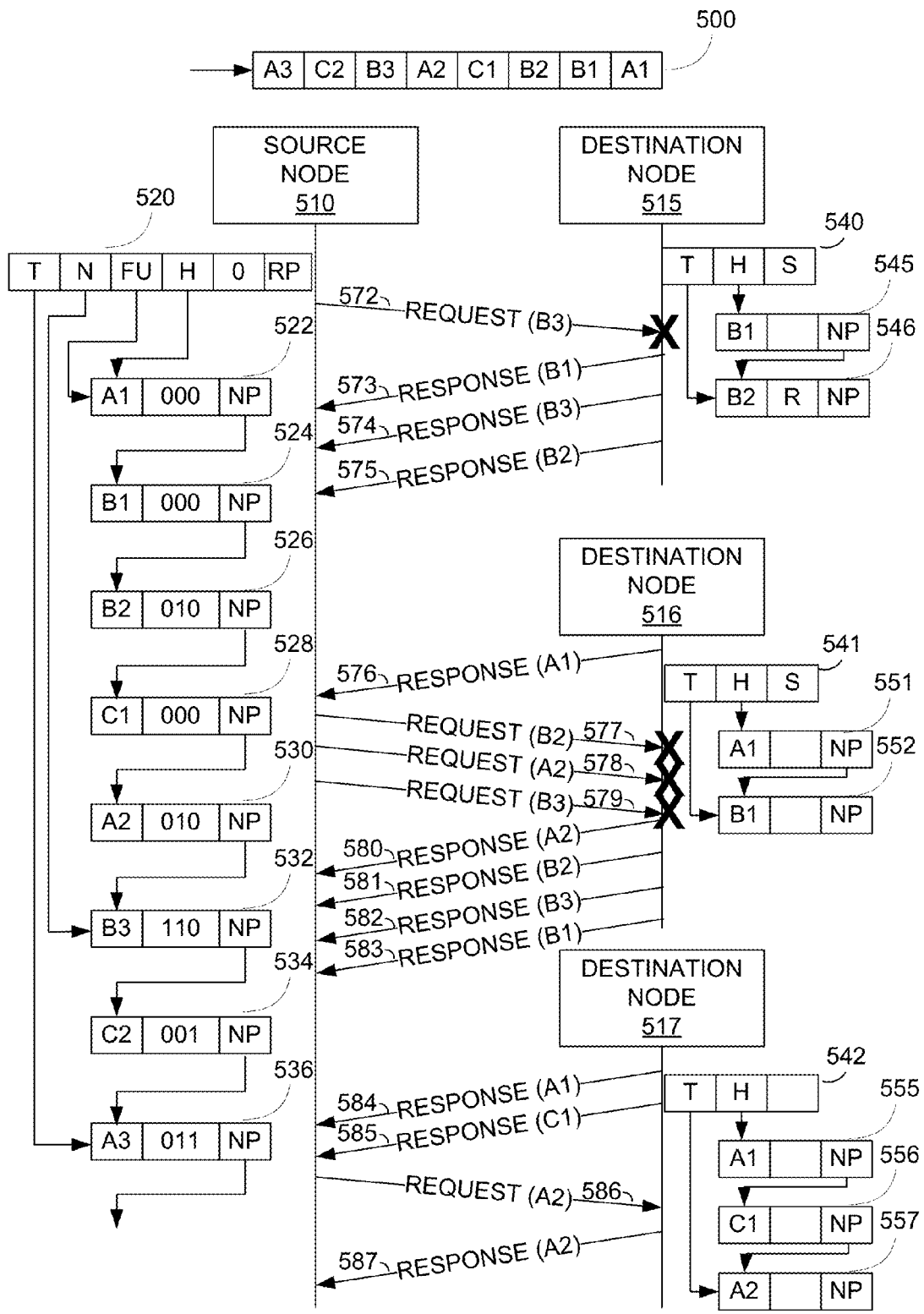

FIG. 5(b) is a continuation of FIG. 5(a). Once a request message has been received, and a new packet descriptor allocated, the destination node may send a response message to the source node indicating that the request message was accepted. In general, an acceptance of a request message indicates that a packet descriptor was added to the outbound descriptor of the destination node, and the destination node is aware of the order in which the data packet should be output. As shown in FIG. 5(b), destination node 515 has sent response messages 573, 575 to the source node to indicate that the request messages for packets B1 and B2 have been received and processed, as described above. Beneficially, example implementations discussed herein do not require that response messages be sent in any order or over a designated communications channel. Thus, as shown, response message 574 for packet B3 may be received by the source node before the response message 575 for packet B2, with no adverse impact on operation.

Upon receipt of the response messages 573, 575 the source node may decrement the count field. It does not matter if the response indicates acceptance or refusal as the count field is used to indicate the number of request messages that are awaiting a response, regardless of if the response is an acceptance or refusal. Upon receipt of a response message indicating acceptance of a request message, the source node performs several functions. One function is to clear the DSM for the request message descriptor associated with the data packet identified in the response message for the destination node that sent the response. As shown, the unresolved indicators for request message descriptors 524, 526 which are associated with the data packets referred to in response messages 573, 575 respectively have been cleared for destination node 515.

Another function is to determine if the first unresolved pointer should be advanced. If the DSM of a request message descriptor indicates that there are no destination nodes that are unresolved, the request message descriptor is now fully resolved. If the first unresolved pointer is pointing to a fully resolved request message descriptor, the first unresolved pointer should be advanced to the next request message descriptor that is indicated as unresolved for any destination node. Operation of the first unresolved pointer will be described in further detail below. In an alternate example embodiment, advancing the first unresolved pointer is deferred until a stream is restarted, as will be described below.

The same processing that was done for response messages indicating acceptance for destination node 515 is also performed for destination nodes 516, 517. As shown, destination node 516 has sent response messages 576, 583 indicating acceptance of the request messages for data packets A1, B1 respectively. The source node may clear the unresolved indicator for those packets at destination node 516 as described above. Likewise, destination node 517 has sent response messages 584, 585, 587 indicating acceptance of the request messages associated with data packets A1, C1, A2 respectively. The source node may clear the unresolved indicator for those packets at destination node 517 as described above. The count field is decremented as each response message is received.

Not all request messages may be accepted by the destination nodes. As shown, request message 572, which identifies the in-flight request message 563 of FIG. 5(a), for packet B3 has been received by destination node 515. However, the destination node may not be able to accept the request message. For example, the destination node may currently be overloaded and does not have available processing power to process the request message. As another example, the destination node may not have sufficient memory resources and is not able to allocate a packet descriptor for packet B3. Regardless of the reason why the destination node is unable to accept a request message, the destination node may inform the source node that a request message is being refused, and that no additional request messages should be sent or may be accepted until the refused request message is accepted.

Destination node 516 may also receive request messages that are not accepted. As shown, request messages 577, 578, 579 may be received by the destination node. The destination node may need to refuse the request message 577 for reasons including those mentioned above. The response message 581 which is for packet B2 may indicate that the request message 577 is being refused. Once the destination node has determined that request message 577 should be refused, the destination node may then reject any subsequently received request messages. As shown, request messages 578, 579 may also be refused.

The reason that later received request messages are refused once a request message from the same stream is refused is that to accept such a request message would result in the list of packet descriptors no longer reflecting the order of the data packets in the stream. As shown in FIG. 5(b), request messages 578, 579 for packets A2, B3 respectively may have been received by the destination node after it has been determined that request message 577 is going to be refused. It is possible that that the condition that caused request message 577 for packet B2 to be refused may have cleared by the time request message 578 for packet A2 is received. If request message 578 is accepted, this would result in the order of the packet descriptors jumping from B1 to A2, which is an undesirable result because the order of the packets in the stream 500 is no longer maintained.

Once a destination node has determined that a request message for a packet cannot be accepted, the destination node may set the stop indicator for the stream in the outbound descriptor. As shown in FIG. 5(b) both destination nodes 515, 516 have set their respective stop indicators in the outbound descriptors 540, 541 to S to indicate that the stream has been stopped. When the stop indicator for the stream is set, the destination node may automatically refuse any request messages that do not include a special indicator referred to as the restart indicator. The restart indicator will be described in further detail below. Thus, the response messages 580, 582 for data packets A2, B3 respectively may indicate that the associated request messages 578, 579 respectively are being refused.

Destination node 517 has not determined that stopping the stream was needed. Thus, when request message 586, which identifies the in-flight request message 571 of FIG. 5(a), for packet A2 is received by destination node 517, the destination node may proceed to allocate a packet descriptor 557 and add the packet descriptor to the end of the list of packet descriptors associated with outbound descriptor 542. The destination node may then send a response 587 indicating acceptance of the request message associated with data packet A2. Each destination node may operate independently of the other destination nodes, and as such one destination node setting the stop indicator for a stream does not affect the ability of another destination node to continue accepting request messages.

Upon receipt of any response message, regardless of which destination node sent the response message, indicating refusal of a request message, the source node may set the restart pending indicator (RP) in the stream descriptor 520 for the stream. The source node may discontinue sending request messages for the stream to all destination nodes until the restart pending indicator is cleared, which will be described further below. It does not matter that there may be a destination node, such as destination node 517, that has not stopped the stream. As long as one destination node has indicated the stream should be stopped via a refusal response, the source node may discontinue sending request messages to all destination nodes for the stream. The reason for this is that it would be inefficient to continue sending request messages when at least one destination node is unable to accept the request message. The level of complexity would be greatly increased if the source node needed to keep track of each destination node's stopped status independently. By stopping all further request messages, the process of restarting the stream is made more efficient, as the source node is able to maintain a single stopped status for the stream. The process of restarting the stream will be described below.

As has been mentioned previously, the example implementations presented herein place no ordering requirement on any messages other than the request messages. Thus, the response messages may be received by the source node from any destination node in any order without any impact on the operation of the system, as the system behavior is the same regardless of the order in which responses are received. As shown, the response message 581 for packet B2 from destination node 516 may be received before other response messages for later packets for that destination node. Likewise, there is no ordering requirement between the various destination nodes. Each destination node operates independently of the other destination nodes.

The source node may continue to decrement the count as each response message is received, regardless of if the response is an acceptance or a refusal. As shown, the count is a zero, because the response messages for all request messages have been received. Once the count goes to zero the stream is eligible to be restarted. Restarting the stream will be described with respect to FIG. 5(c).

Figure 5C:
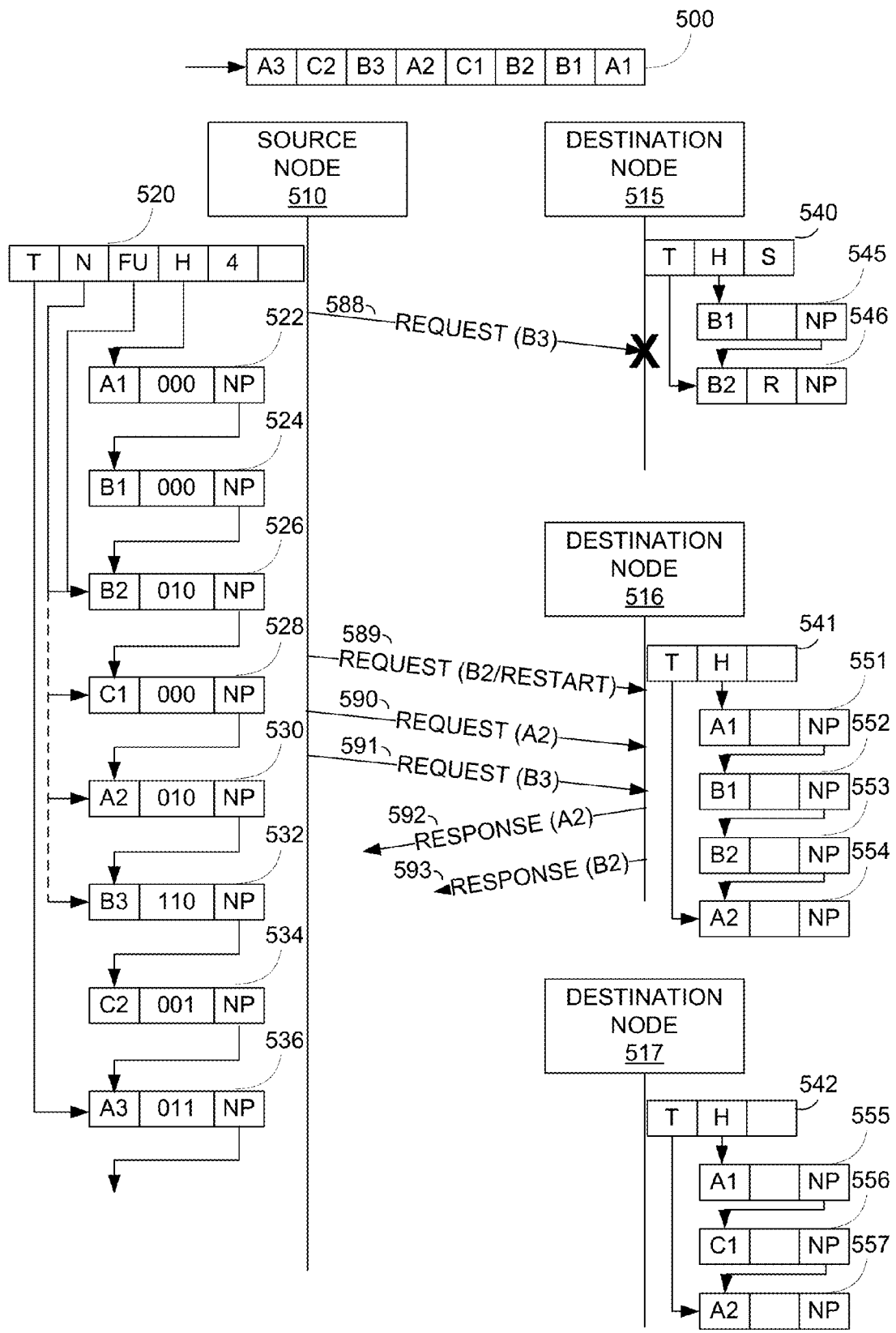

FIG. 5(c) is a continuation of FIG. 5(b). Once the count reaches zero, it may be time to restart the stream. The source node 510 may clear the restart pending indicator. The source node may determine the first unresolved request message descriptor, which may be the request message descriptor that is closest to the head of the list of request message descriptors and is unresolved for at least one destination node. The source node may begin reissuing request messages starting with the first unresolved request message descriptor. The reason for determining the first unresolved request message descriptor is that request messages are issued in order and if a request message is refused, no later issued request messages may be accepted, absent the restart indicator. Thus, the first unresolved request message descriptor indicates the point in the list of request message descriptors to begin reissuing request messages because it identifies the request message descriptor that is closest to the head of the list of request message that has been refused by at least one destination node. As that node(s) may not accept any request messages for a data packet later in the list of request message descriptors until the refused request message is accepted, the first unresolved request message descriptor may identify the point where reissuing request messages should begin.

The source node 510 may determine the first unresolved request message descriptor by using the first unresolved pointer. In one example implementation, when it is time to restart the stream, the source node may examine the DSM of the request message descriptor pointed to by the first unresolved pointer. If the DSM indicates that no destination nodes are unresolved, the source node may advance the first unresolved pointer to the next request message descriptor in the list. The process is then repeated until a request message descriptor is found that is unresolved for at least one destination node. As shown in FIG. 5(*b*), the first unresolved pointer may have pointed to request message descriptor 522. In FIG. 5(*c*), the source node may have examined request message descriptor 522 and determined that the DSM was not set for any destination node and advances to request message descriptor 524. Likewise, request message descriptor 524 does not have the DSM set for any destination node, so the source node advances the first unresolved pointer to request message descriptor 526. As shown, request message descriptor has the DSM set for destination node 517, as indicated by the zero-one-zero in the unresolved field. As expected, request message descriptor 526 is associated with data packet B1, which was the first data packet that was refused by any destination node, as was shown in FIG. 5(*b*). It is from this point that reissuing request messages should begin.

The first request message descriptor that is unresolved for at least one destination node is the point where sending request message should be restarted. The reason for this is that if a request message descriptor indicates that no destination nodes are unresolved, there is one of two possibilities for each destination node. Either each destination node was not selected to receive the data packet associated with the request message descriptor or it was selected and has already responded with an acceptance of the associated request message. In either case, there is no need to resend the request message to any destination node, as either the data packet associated with the request message is not needed or has already been accepted by all possible destination nodes.

In a different example implementation, the first unresolved pointer may be examined and updated, if needed, upon receipt of any response message indicating acceptance of a request message. The source node 510 may receive a response message and if the response message indicates acceptance of the request message, the source node may clear the unresolved indicator of the request message descriptor for the responding node. If the first unresolved pointer is pointing to the request message descriptor associated with the response, the source node may determine if the request message descriptor is now fully resolved. If so, the source node may advance the first unresolved pointer to the next request message descriptor that has at least one destination node indicated as unresolved.

Regardless of implementation, after the processing described above, the first unresolved pointer may point to the first unresolved request message descriptor. The source node 510 may then set the next pointer to point to the request message descriptor pointed to by the first unresolved indicator. The source node may then begin resending request messages from the request messages descriptor pointed to by the next pointer, just as was described with respect to FIG. 5(*a*). It should be understood that the source node may only send request messages to destination nodes whose unresolved indicator is set. Thus, if a request message was sent to two destination nodes and one accepted the request and one refused, the unresolved indicator would only remain set for the destination node that refused. As such, when the request message is resent, it may only be sent to the destination node that refused.

As mentioned above, when a destination node has set the stop indicator, the destination node may automatically refuse any request message that does not include a restart indicator. Thus, if the source node 510 simply began reissuing request messages, those request messages would be automatically rejected by any destination node that has the stop indictor set, regardless of the ability of the destination node to accept the request message. To overcome this, the source node may use the count field to determine when the restart indicator may be included in a request message. The source node may attempt to restart a stream when the count reaches zero. Thus whenever the count indicates zero, the source node may include the restart indicator in the next request message sent. The reason for this is that if the count field is zero, there all request messages have received a response. Thus, there is no longer the possibility of a destination node receiving a request message in an incorrect order, because there are no request messages in-flight.

As shown in FIG. 5(*c*), the next pointer has been set to point to request message descriptor 526, which is also pointed to by the first unresolved pointer. As shown, request message descriptor 526 has the unresolved indicator set for destination node 516. Because at this point the count would be zero (not shown), request message 589 for data packet B2 may include the restart indicator. The next pointer may be advanced to request message descriptor 528. As shown, request message descriptor 528 does not have the unresolved indicator set for any destination nodes, indicating that all destination nodes have either already accepted or do not need the data packet associated with request message descriptor 528. The source node 510 may then advance the next pointer to request message descriptor 530.

Request message descriptor 530 indicates that destination node 516 has the unresolved indicator set. If no response has yet been received for request message 589, the count will be one. As such, request message 590 may not include the restart indicator. Request message 589 may be received by destination node 516. Because the request message includes the restart indicator, destination node 516 may clear the stop indicator, and as such may not automatically refuse the reject message. It should be understood that including the restart indicator in a request message does not guarantee that a destination node will accept the request message. Destination node 516 may still process the request message as described above to determine if the request message can be accepted. If so, a packet descriptor 553 is allocated and added at the end of the list of packet descriptors. If not, the request message may be refused and the process described above with respect to FIG. 5(*b*) may be performed. Request message 590 may be received and processed by destination node 516. If request message 589 was accepted, the stop indicator would remain clear, thus request message 590 would not be automatically refused. If request message 590 can be accepted, packet descriptor 554 may be allocated and added to the list.

The source node 510 may advance the next pointer to request message descriptor 532. As shown, request message descriptor 532 has the unresolved indicators set for destination nodes 515, 516. There are two possible scenarios that may occur at this point. The first scenario is that response messages 592, 593 have not yet been received by the source node, and as such the count may not be zero. The second scenario is that the response messages have been received.

In the first scenario, as shown in FIG. 5(c), because the count is not zero, the restart pending indicator is not included in the request messages 588, 591. The lack of a restart indicator is not relevant for destination node 516, as that destination node has already had the stop indicator cleared. However, destination node 515 had the stop indictor set, as was described in FIG. 5(b). Because the restart pending indicator is not included in request message 588, destination node 515 may automatically refuse the request, causing the stream to stop again. However, the situation may automatically resolve itself. Eventually, the responses 592, 593 may be received and the count will go to zero. The source node may again attempt to restart the stream by including the restart indicator. Eventually, the request message for request message descriptor 532 may become the first unresolved request, and as such may include the restart indicator.

In the second scenario (not shown), the responses 592, 593 may be received by the source node before request messages 588,591 are sent. In this case, the count will have reached zero, because there are no outstanding request messages. Thus, the source node may include the restart indicator in request messages 588, 591. Destination node 515 may clear the stop indicator based on the restart indicator, and further processing occurs as described above. Destination node 516 may receive request message 591 which also includes the restart indicator. Destination node 516 may effectively ignore the restart indicator as the stop indicator is not set. Alternatively, for ease of implementation, a destination node may simply clear the stop indicator, regardless of initial state, whenever a restart indicator is included in a request message.

Figure 6:
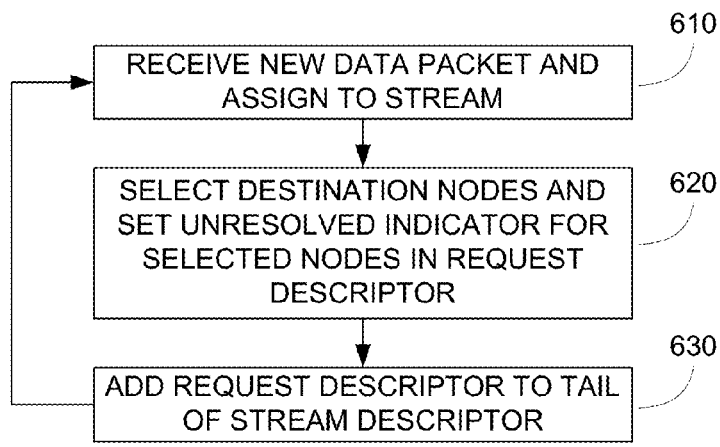
FIG. 6 depicts an example of a high level flow diagram for adding new data packets.

FIG. 6 depicts an example of a high level flow diagram for adding new data packets. In block 610 a new data packet may be received and assigned to a stream. For example, a new data packet may be received by one of the ports of a source node. The stream module may then assign the data packet to one of the streams on the source node.

In block 620, destination nodes may be selected for the data packet and the unresolved indicator for the selected nodes may be set to indicate that the node is not yet resolved. For example, a new request message descriptor may be allocated for the data packet. In example implementations in which the unresolved indicator is a bit field, the selected destination nodes may be set to a value of one, while destination nodes that are not selected are set to zero. The unresolved indicator may be used to determine which nodes may receive a request message, as will be described with respect to FIG. 7.

In block 630 the request descriptor may be added to the tail of the stream descriptor. The request message descriptor may be added to the end of the linked list of request message descriptors for the stream that was selected in block 610. The tail pointer of the stream descriptor on the source node for the stream that was selected in block 610 may be used to determine where the end of the linked list is located. By adding the request message descriptor to the end of the linked list, the order of the request message descriptors may be the same as the order of data packets as they are put into a stream.

Figure 7:
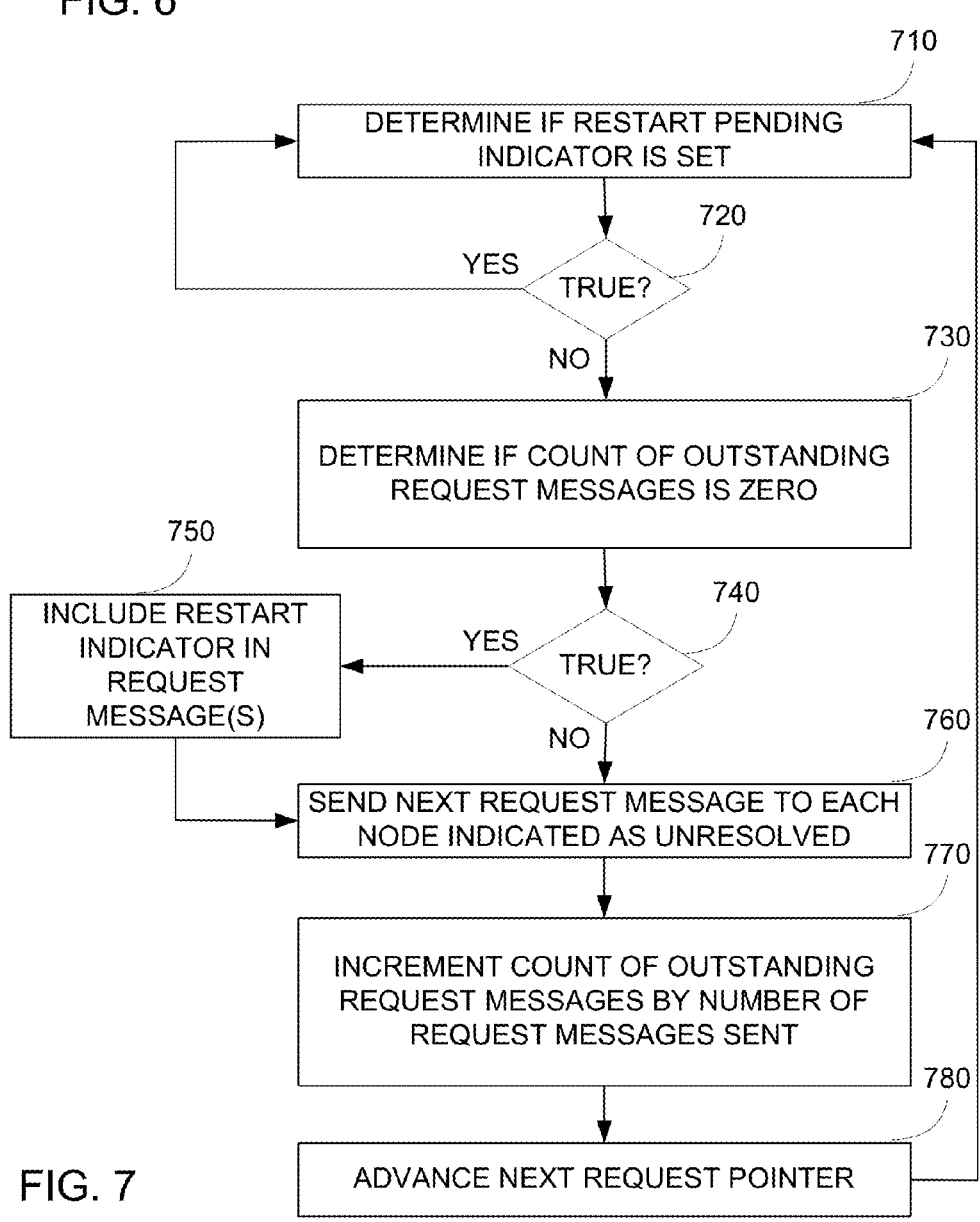
FIG. 7 depicts an example of a high level flow diagram for sending request messages.

FIG. 7 depicts an example of a high level flow diagram for sending request messages. In block 710 it may be determined if the restart pending indicator for the stream is set. A set restart pending indicator may mean that the stream has previously been stopped. It should be noted that it does not matter which destination node caused the restart pending indicator to become set. In block 720 a decision is made based on the determination in block 710. If the restart pending indicator is set, the result of the decision will be true and the process returns to block 710, without any request messages being issued. No request message may be issued, because the stream is currently stopped. The process may continue the loop between blocks 710 and 720 for as long as the restart pending indicator is set for the stream.

In block 730 it may be determined if the count of outstanding request messages is zero. If the count of outstanding request messages is zero in block 740, it means that there are currently no request messages that have been sent that are still awaiting a response. The count may be zero when a stream has been stopped and all responses have been received. The count may also be zero when the stream is not stopped, but responses have already been received for all request messages that have been sent. If the count is zero, in block 750 the restart indicator is set for the next request message that may be sent. The restart indicator may be used to notify destination nodes that have the stop indicator set for the stream that the source node is attempting to restart the stream.

In block 760 the next request message is sent to each node indicated as unresolved. As described with respect to FIG. 6, the request message descriptor may contain an unresolved indicator that identifies the destination nodes that should receive a request message for a data packet. In block 760 a request message may be sent to each destination node that is indicated as not yet resolved.

In block 770, the count of outstanding request messages may be incremented by the number of request messages that were sent in block 760. As mentioned above, the count may be used to determine when response messages have been received for every request message. Incrementing the count each time a request message is sent may allow the source node to keep track of how many request messages are awaiting a response. The count may be incremented each time a request message is sent, and decremented each time a response message is received. When the count reaches zero, all request messages have received a response. Decrementing the count will be described with respect to FIG. 8.

In block 780, the next request pointer may be advanced to point to the next request message descriptor in the list of request message descriptors for a stream. If the next request pointer currently is pointing to the same request message descriptor as the tail pointer of the stream descriptor, then request messages have already been sent for all data packets in the stream. The process may stay in block 780 until the next request pointer may be advanced. In other words, request messages have been sent for all data packets in the stream and the process may stay in block 780 until a new data packet arrives and is assigned to the stream. The process may return to block 710 once the next request pointer has been advanced.

Figure 8:
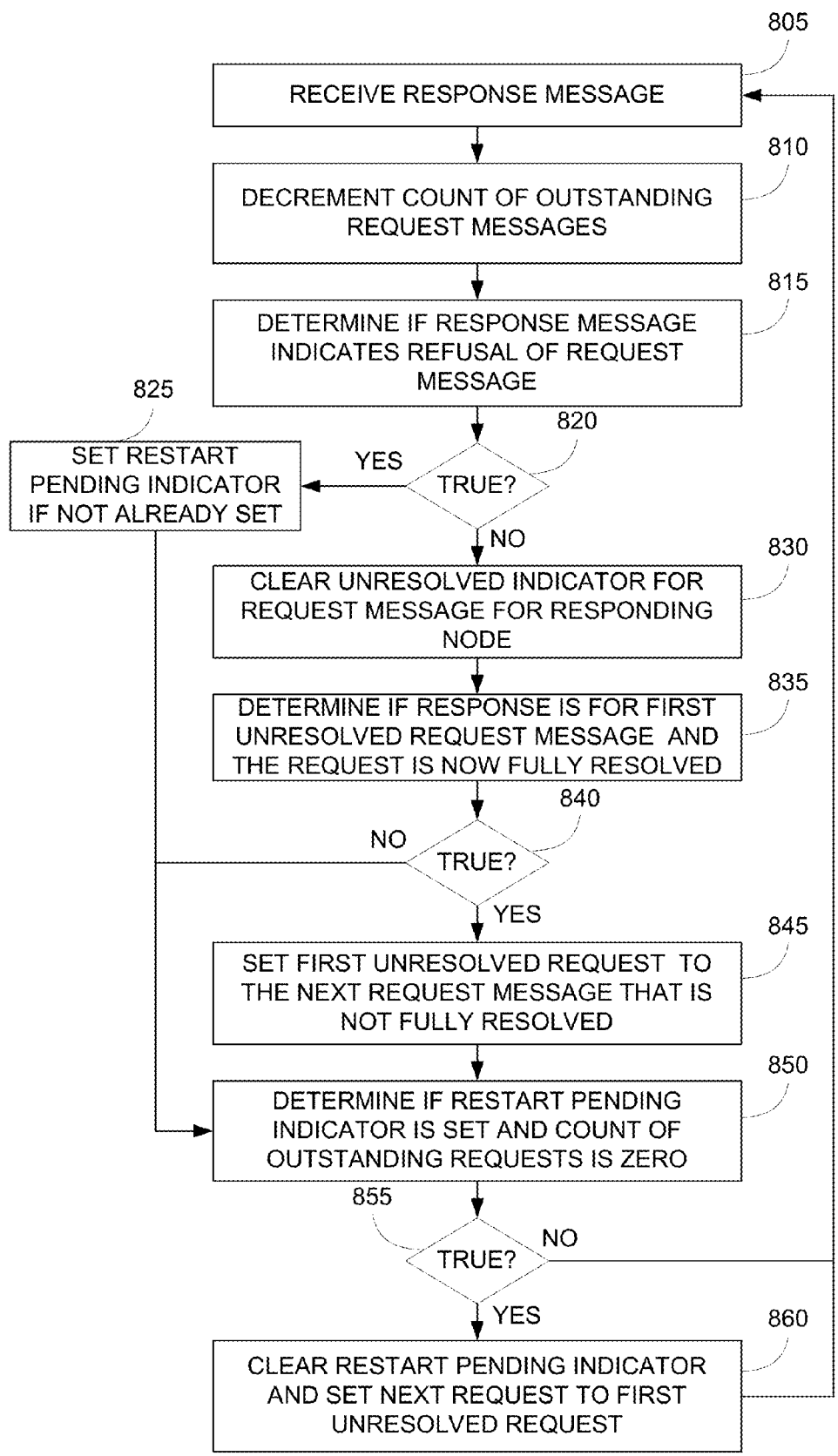
FIG. 8 depicts an example of a high level flow diagram for receiving response messages.

FIG. 8 depicts an example of a high level flow diagram for receiving response messages. In block 805 a response message from a destination node may be received at a source node. In block 805 is does not matter from which destination node the response message originated. In block 810 the count of outstanding request messages may be decremented. As mentioned above, the count of outstanding request messages may be used to determine when responses to all request messages have been received. As such, the count is decremented upon receipt of each response message. Once the count reaches zero, there are no longer any outstanding request messages. Just as in block 805, in block 810 it does not matter from which node the response was received. In block 810 it also does not matter if the response indicates the request message is being accepted or refused. For purposes of keeping track of how many request messages are awaiting a response, it does not matter if the response is an acceptance or a refusal of a request message.

In block 815 it may be determined if the response message received in block 805 indicates a refusal of the request message. If the response message indicates a refusal of the request message, it indicates that the destination node that sent the response is either attempting to stop the stream or that the stream is already stopped at the destination node that sent the response and the response is for a request message that was issued before the source node became aware that the stream should be stopped. In block 820 if it is true that the response message indicates refusal of the request message, the process moves to block 825.

In block 825 the restart pending indicator for the stream may be set if it was not already set. In some example implementations, the restart pending indicator is set in block 825 regardless of the initial state. Regardless of implementation, upon completion of block 825, the restart pending indicator for the stream may be set. As was described with respect to FIG. 7, the restart pending indicator may be used to determine when new request messages are sent. The process may then move to block 850 which will be described below.

If it is determined in block 820 that the response message does not indicate refusal, the process moves to block 830. In block 830, the unresolved indicator for the request message is cleared for the responding node. In other words, in block 830 a response from a destination node has been received indicating that the destination node has accepted the request message. As such, the request message is no longer unresolved for the destination node that is sending the response. The request message descriptor associated with the data packet referred to in the response may be updated to indicate that the responding node has accepted the request message by clearing the unresolved indicator for the responding node.

For example, in implementations that use a bit field to indicate the unresolved status, the bit that corresponds to the responding node may be cleared to indicate that the node has accepted the request message and as such is no longer unresolved. As was described above, a cleared bit may indicate that either the request message was accepted by the destination node or that the request message descriptor is associated with a data packet that is not needed by the destination node. In either case, there is no longer any need to send or resend the request message to a destination node that has a clear unresolved indicator.

In block 835 it may be determined if the response message is for the request message that is indicated as the first unresolved request message. In addition, it may be determined if the request message is now fully resolved. In other words, it may be determined in block 835 if the first unresolved pointer of the stream descriptor points to the request message descriptor associated with the data packet referenced in the response message. It may also be determined if all selected nodes have now responded indicating acceptance of the request message such that the request message is now fully resolved. In block 840 if the result of the determination in block 835 is false the process moves to block 850, which will be described below. If the result in block 840 is true, the process moves to block 845.

If the response is for the request message pointed to by the first unresolved pointer and that request message descriptor is now fully resolved, the process moves to block 845. In block 845, the first unresolved request pointer is set to point to the next request message descriptor that is not fully resolved. It should be understood that the next request message descriptor that is not fully resolved may not be immediately adjacent to the request message descriptor that is currently pointed to by the first unresolved indicator. In other words, the first unresolved pointer may be advanced through the list of request message descriptors until a request message descriptor is found that is not fully resolved. In an alternate example implementation, the first unresolved pointer is not updated until a stream is restarted, as was described above with respect to FIG. 5.

In block 850 it may be determined if the restart pending indicator is now set and the count of outstanding requests is now zero. In block 855, if the determination is not true, the process moves back to block 805 to await additional responses. A false determination in block 855 indicates one of several conditions. One condition is the restart pending indicator is not set, which means the stream is not currently stopped. Another condition is that the count of outstanding requests is not zero, which means that there are request messages still awaiting a response. A third condition is the combination of the first two conditions. Regardless of the specific reason the determination in block 855 is false, it means that the stream is either not currently stopped or is stopped but is not eligible to be restarted. In either case, restarting the stream is not needed.

If the determination in block 855 is true, it means that the stream is currently stopped and is now eligible to be restarted. The process moves to block 860 wherein the restart pending indicator may be cleared for the stream. In addition, the next request pointer may be set to point to the request message descriptor that is pointed to by the first unresolved pointer. As such, when the source node begins issuing request messages again, the request messages may begin with the first request message descriptor that was not resolved, thus preserving the ordering of the request messages. The process may then return to block 805 to await additional response messages.

Figure 9:
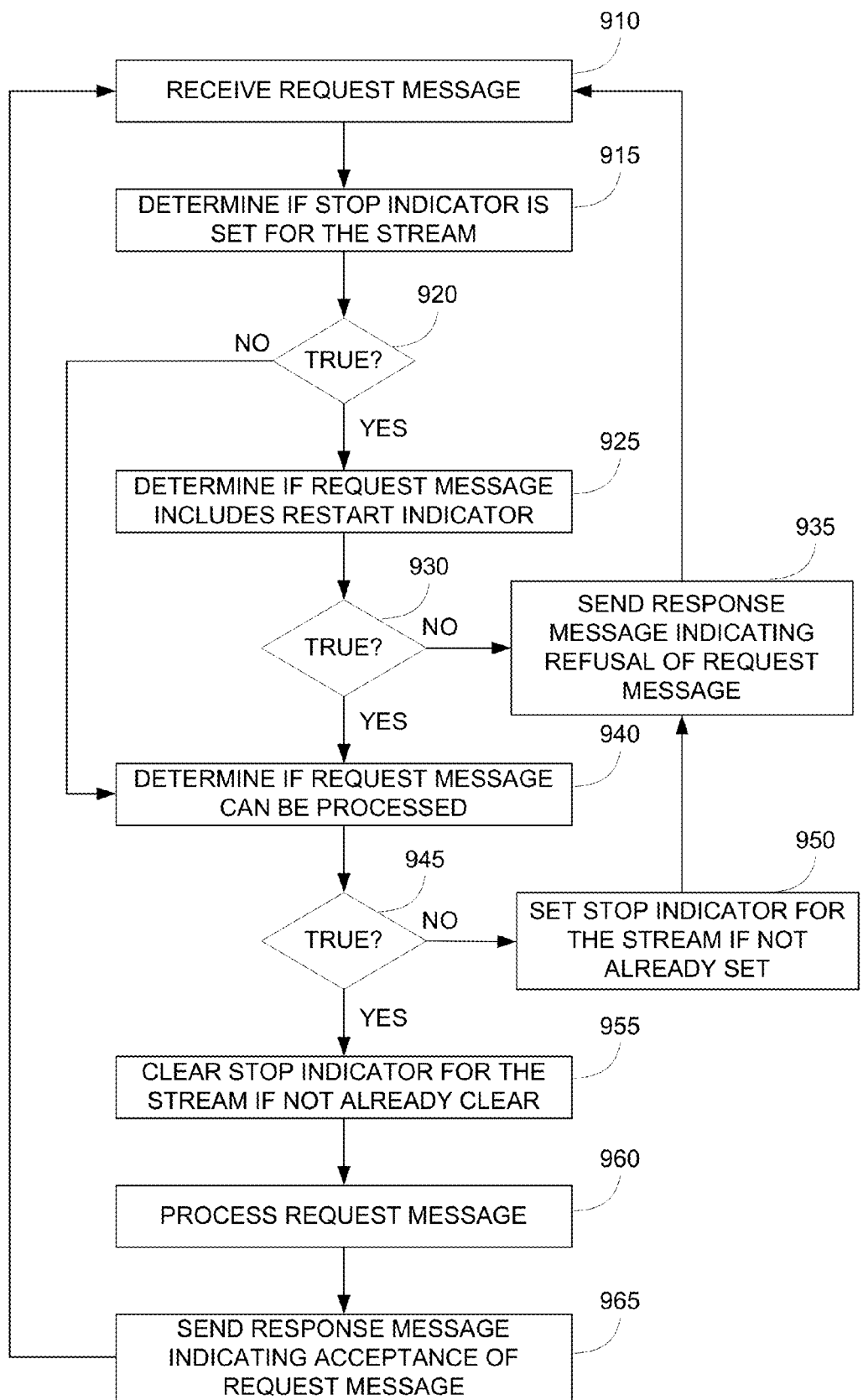
FIG. 9 depicts an example of a high level flow diagram for receiving request messages.

FIG. 9 depicts an example of a high level flow diagram for receiving request messages. The example flow diagram depicted in FIG. 9 may occur independently at each destination node. In block 910 a destination node receives a new request message from a source node. In block 915 it is determined if the stop indicator for the stream associated with the request message is set. In block 920, if it is determined that the stop indicator is not set, the process moves to block 940, which will be described in further detail below. If at block 920 it is determined that the stop indicator is set for the stream, the process moves to block 925.

In block 925 it is determined if the request message includes a restart indicator. If block 925 is reached, the stop indicator for the stream is currently set. At block 930, if the restart indicator is not included in the request message, the process moves to block 935, wherein a response message indicating a refusal of the request message is sent to the destination node. The request message may be refused because a request message for a stopped stream cannot be accepted without the restart indicator. Accepting a request message for a stopped stream may result in request messages being received out of order, thus a request message for a stopped stream should be refused. The process may move back to block 910, wherein the destination node continues to wait for the next request message.

If it is determined in block 930 that the request message does include the restart indicator, the process moves to block 940. In block 940, it is determined if the request message can be processed. It is possible that the condition that caused the stream to be stopped in the first place still exists, thus the stream should not be restarted, even if the request message includes the restart indicator. For example, if the stream was stopped because a packet descriptor could not be allocated, it is possible that a packet descriptor still cannot be allocated. If the stream has not been previously stopped, it still needs to be determined if the request message that has been received can be processed by the destination node. In some implementations, the stop indicator is always cleared when entering block 940. The stop indicator may then be reset if necessary after execution of block 940. At block 945, if it is determined that the request message cannot be processed, the process moves to block 950, wherein the stop indicator for the stream is set, if it is not already set. In some implementations, the stop indicator may be set in block 950, without regard to the current state of the stop indicator. In either case, the stop indicator may be set for the stream after execution of block 950. A refusal response is sent in block 935, as was described above.

If at block 945 it is determined that the request message can be processed by the destination node, the process may move to block 955. In block 955, the stop indicator for the steam is cleared if it was not already clear. In some implementations, the stop indicator may be cleared in block 955, regardless of the current state. In either case, after execution of block 955, the stop indicator for the stream is cleared. In block 960 the request message is processed. Processing the request message can include adding a new packet descriptor to the outbound descriptor, allocating storage space for the data packet associated with the request message, and any other actions that are needed for eventual transfer of the data packet associated with the request message to be sent from the source node to the destination node. However, for purposes of the present description, processing the request message may mean that the destination node is made aware a data packet is available for delivery and the destination node is willing and able to receive the data packet.

In block 965 a response message indicating acceptance of the request message is sent to the source node. The response message indicates to the source node that the destination node has received the request message and is able to process the request message. The source node may then continue to send request messages, as was described with respect to FIG. 7. The process may return to block 910, wherein the destination node awaits the next request message.

We claim:

1. A method comprising:
   selecting, at a source node, destination nodes to each receive a request message;
   setting an unresolved indicator for each of the selected destination nodes in a request message descriptor, wherein the unresolved indicator indicates which destination nodes to send a request message to;
   sending a number of request messages to the selected destination nodes indicated as unresolved;
   clearing the unresolved indicator for each selected destination node in the request message descriptor when a response message indicating acceptance of the request message is received from each selected destination node;
   setting a stop indicator associated with a selected destination node that refuses to receive the request message sent to the selected destination node, wherein the stop indicator causes the destination node to refuse subsequent request messages received until the destination node receives a restart indicator;
   in response to a destination node of the selected destination nodes refusing the request message and receiving a number of response messages equal to the number of request messages sent, resending the request message with the restart indicator to the destination node,
   wherein the restart indicator indicates to the destination node to unset the stop indicator and restart a stream associated with the request message.

2. The method of claim 1 wherein the request message descriptor is fully resolved once the unresolved indicator is cleared for all destination nodes.

3. The method of claim 1 further comprising:
   determining when there are any outstanding request messages; and
   including the restart indicator in the request message sent to each destination node when it is determined that there are no outstanding request messages.

4. The method of claim 1 further comprising:
   receiving a response message indicating refusal of the request message; and
   setting a restart pending indicator for the stream of ordered request messages.

5. The method of claim 4 further comprising:
   determining when there are no outstanding request messages; and
   clearing the restart pending indicator when there are no outstanding request messages.

6. A method comprising:
   determining, at a destination node, when a stop indicator for an ordered list of request messages is set, wherein the stop indicator indicates when a stream of ordered data packets associated with an outbound descriptor is stopped at the destination node associated with the outbound descriptor; and
   while the stop indicator is not set:
      retrieving a request message descriptor identified by a next request indicator;
      retrieving an indication of a destination node for a request message that is unresolved;
      sending the request to the destination node indicated as unresolved; and
      advancing the next request indicator; and
   when the stop indicator is set:
      the destination node with the set stop indicator refuses to receive the request message; and
      in response to the destination node refusing the request message and receiving a number of response messages equal to the number of request messages sent, resending, from a source node, the request message that includes a restart indicator, wherein the restart indicator indicates to the destination node to clear the stop indicator that is set and the destination node will accept subsequent request messages once the destination node receives the restart indicator.

7. The method of claim 6 further comprising:
   receiving a response message from the destination node that received the request message;
   identifying the request message associated with the response message; and
   indicating the destination node that sent the response message as being resolved for the request message for the destination node when the response message indicates acceptance of the request message sent to the destination node.

8. The method of claim 6 further comprising:
maintaining a first unresolved indicator for the ordered list of request messages; and
advancing the first unresolved indicator to a next unresolved request message when the request message indicated by the first unresolved indicator becomes fully resolved.

9. The method of claim 8 further comprising:
setting the restart pending indicator when the response to the request message indicates a refusal of the request message; and
clearing the restart pending indicator once response messages are received for all outstanding request messages of the ordered list.

10. The method of claim 9 further comprising:
setting the next request indicator to the first unresolved indicator upon clearing the restart pending indicator; and
resuming sending request messages starting with the request message indicated by the next request indicator.

11. The method of claim 6 further comprising:
determining when there are any outstanding request messages; and
setting the restart indicator in the request message sent to the unresolved destination nodes.

12. A device comprising:
a node selection module to determine which destination nodes will receive a request message and to indicate the determined destination nodes as unresolved;
a request module to send the request messages to the determined destination nodes and to resend the request messages with a restart indicator to each of the unresolved destination nodes with a set stop indicator, wherein:
   the restart indicator is sent after a number of responses equal to a number of the request messages sent is received;
   the stop indicator is set when the destination node refuses to receive the request message and continues to refuse the request message until the destination node receives the restart indicator, and
   each of the restart indicators indicate to each of the destination nodes with the stop indicator that is set to restart a stream associated with the request message and to unset the stop indicator and
a response module to receive response messages indicating acceptance or refusal of the request message from the destination nodes, and to indicate the request message as resolved for destination nodes indicating acceptance of the request message.

13. The device of claim 12 wherein the request module further includes the restart indicator in the request message when there are no outstanding request messages.

14. The device of claim 12 wherein the response module further indicates the request message as fully resolved once all the destination nodes indicated as unresolved have indicated acceptance of the request message.

15. The device of claim 14 wherein the device is an application specific integrated circuit.

* * * * *